(12) United States Patent
Yang et al.

(10) Patent No.: US 7,145,275 B2
(45) Date of Patent: Dec. 5, 2006

(54) BEARING WITH AUXILIARY MAGNETISM

(75) Inventors: Ching-Min Yang, Taipei (TW);
Chien-Chung Huang, Taipei (TW)

(73) Assignee: Asia Vital Component Co., Ltd., Kaohsiung (TW)

( * ) Notice: Subject to any disclaimer, the term of this patent is extended or adjusted under 35 U.S.C. 154(b) by 0 days.

(21) Appl. No.: 11/015,035

(22) Filed: Dec. 20, 2004

(65) Prior Publication Data

US 2006/0131972 A1     Jun. 22, 2006

(51) Int. Cl.
*H02K 7/09* (2006.01)
(52) U.S. Cl. .............. 310/90.5; 310/67 R; 310/90
(58) Field of Classification Search .......... 310/67 R, 310/90, 90.5
See application file for complete search history.

(56) References Cited

U.S. PATENT DOCUMENTS

| 3,742,267 | A | * | 6/1973 | Papst et al. | ............... 310/67 R |
| 4,647,803 | A | * | 3/1987 | von der Heide et al. | ..... 310/51 |
| 4,682,065 | A | * | 7/1987 | English et al. | ................ 310/90 |
| 6,286,199 | B1 | * | 9/2001 | Bobay et al. | ................. 29/596 |
| 6,849,978 | B1 | * | 2/2005 | Sun et al. | ................... 310/90.5 |

* cited by examiner

*Primary Examiner*—Thanh Lam

(57) ABSTRACT

A bearing assembly with auxiliary magnetism comprises a shaft, a fan base and a bearing. The fan base provides a hollow shaft seat with a receiving space to accommodate the shaft. The bearing fits with the shaft for supporting the shaft. A magnetic part surrounds the shaft to attract the shaft such that the fan blade hub can be fixed at a specific position.

1 Claim, 3 Drawing Sheets

BEARING WITH AUXILIARY MAGNETISM

BACKGROUND OF THE INVENTION

1. Field of the Invention

The present invention is related to a bearing with auxiliary magnetism and particularly to bearing assembly, which provides at least a magnetic part in a shaft seat of the motor to attract the shaft, for the shaft running steadily.

2. Brief Description of the Related Art

Due to information industry progressing rapidly, operation speed of the central processing unit in the information products is getting faster and generated heat is increased along with the faster operation speed. In order to remove the heat, a heat dissipation device is essential for the information products. The most popularly used heat dissipation device is the cooling fan because the cooling fan is very convenient to be used and the cost of the cooling fan is cheap too. Quality of the cooling fan totally depends on if the motor is in a state of running smoothly. Unsteady running motor significantly affects normal operation of the entire system or device and the bearing in the motor is a key factor to influence running quality and running steadiness of the motor.

Generally, a bearing used in the motor usually has a plurality of balls and the balls rotate in the bearing casing. The bearing casing is easy to deviate from the original position thereof due to the inclining shaft so that a clearance is created in the bearing casing to affect running and performance of the motor. Thus, disadvantages such as vibration, noise, generating heat and undesirable power consumption occur in the motor.

Taiwanese Patent Official gazette No. 535,885 discloses a cooling fan, which is composed of a fan blade set, a coil set, a circuit board and a bottom plate. The fan blade set has a shaft inserted into the coil set and there are a ball bearing and an oily bearing stacked vertically in the coil set with O rings and C shaped retaining rings at upper sides and the lower sides of the bearings fixedly attached to the shaft. The characteristics of the prior art is in that a magnetic device is provided on the bottom plate corresponding to the lower end of the shaft and the magnetic device can attract the shaft to keep the fan blades at a fixed position. In this way, a preset pressure can be created to exert the ball bearing such that the ball in the bearing can run at the same track. Besides, noise resulting from friction can be removed because of the magnetic device attracting the shaft.

However, the preceding magnetic device provides a flat shape and only the lower end of the shaft can be attracted. In this way, it is obvious that the shaft is unable to avoid disadvantages such as swaying and noising.

SUMMARY OF THE INVENTION

An object of the present invention is to provide a bearing assembly with auxiliary magnetism in which a magnetic part surrounds the shaft to attract the shaft and the shaft can keep to run with respect to the axial direction so as to lower operational current.

Another object of the present invention is to provide a bearing assembly with auxiliary magnetism with which the shaft can run steadily to attenuate noise.

A further object of the present invention is to provide a bearing assembly with auxiliary magnetism in which the bearing can be used with any type of bearing.

Accordingly, the bearing assembly with auxiliary magnetism according to the present invention comprises a shaft, a fan base and a bearing. The fan base provides a hollow shaft seat with a receiving space to accommodate the shaft. The bearing fits with the shaft for supporting the shaft. A magnetic part surrounds the shaft to attract the shaft such that the fan blade hub can be fixed at a specific position.

BRIEF DESCRIPTION OF THE DRAWINGS

The detail structure, the applied principle, the function and the effectiveness of the present invention can be more fully understood with reference to the following description and accompanying drawings, in which.

DETAILED DESCRIPTION OF THE INVENTIONT

Figure 1:
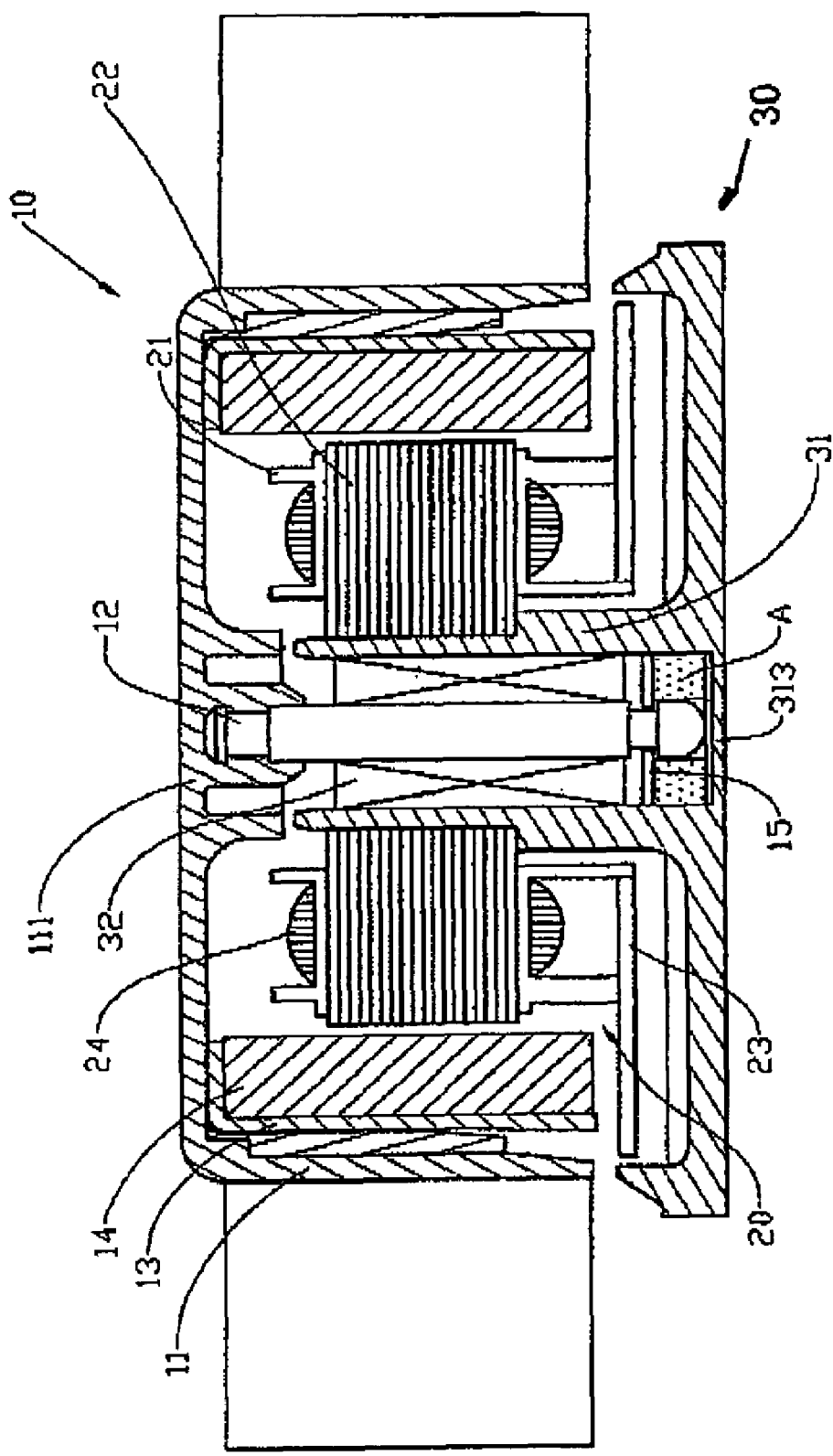
FIG. 1 is a sectional view of the first embodiment of a bearing assembly with auxiliary magnetism according to the present invention.

Referring to FIG. 1, the first embodiment of a bearing assembly with auxiliary magnetism according to the present invention includes a fan blade set 10, a motor set 20 and a fan base 30. The fan blade set 10 is composed of a fan blade hub 11, a shaft 12, a motor case 13 and a magnetic strip 14. The shaft 12 is mounted to a hub seat 111 formed at the central bottom of the fan blade hub 11. The motor case 13 is disposed at the inner side of the fan blade hub 11 and the magnetic strip 14 is disposed at the inner side of the motor case 13.

The motor set 20, which is attached to the fan seat 30, is composed of an insulation frame 21, silicon steel sheets 22, a circuit board 23 and a coil 24. The silicon steel sheets 22 are disposed outside the insulation frame 21 and the insulation frame 21 is surrounded with the coil 24. The fan base 30 has a hollow shaft seat 31 at the center thereof. The circuit board 23 is located between the bottom of insulation frame 21 and the shaft seat 31. A bearing 32 press fit with the inner side of the hollow part of the shaft seat 31 and another end of the shaft 12 is received in an accommodation space formed between the bottom 313 of the shaft seat 31 and the bearing 32. It is noted that the bearing 32 can be a ball bearing, an oily bearing or a dynamic pressure bearing and the another end of the shaft 12 is a movable end.

An annular magnetic part A is disposed to surround the movable end of the shaft 12 to attract the shaft 12 and allow the fan blade hub being fixed at a specific position. Further, the shaft 12 has a neck part next to the movable end and a retaining ring 15 engages with the neck part to restrict the magnetic part A moving upward. Besides, the preceding bearing 32 preferably is the oily bearing to produce a steady axial exerting force for running smoothly and enhancing operational performance of motor such as diminished vibration, attenuate noise, less heat generation, less power consumption and prolonged life span. In addition, the magnetic part A keeps a gap from the shaft 12, that is, a clearance is provided between the inner side of the magnetic part A and the shaft 12, and only the outer side of the magnetic part A contacts with the inner side of the hollow part of the shaft seat 31.

Figure 2:
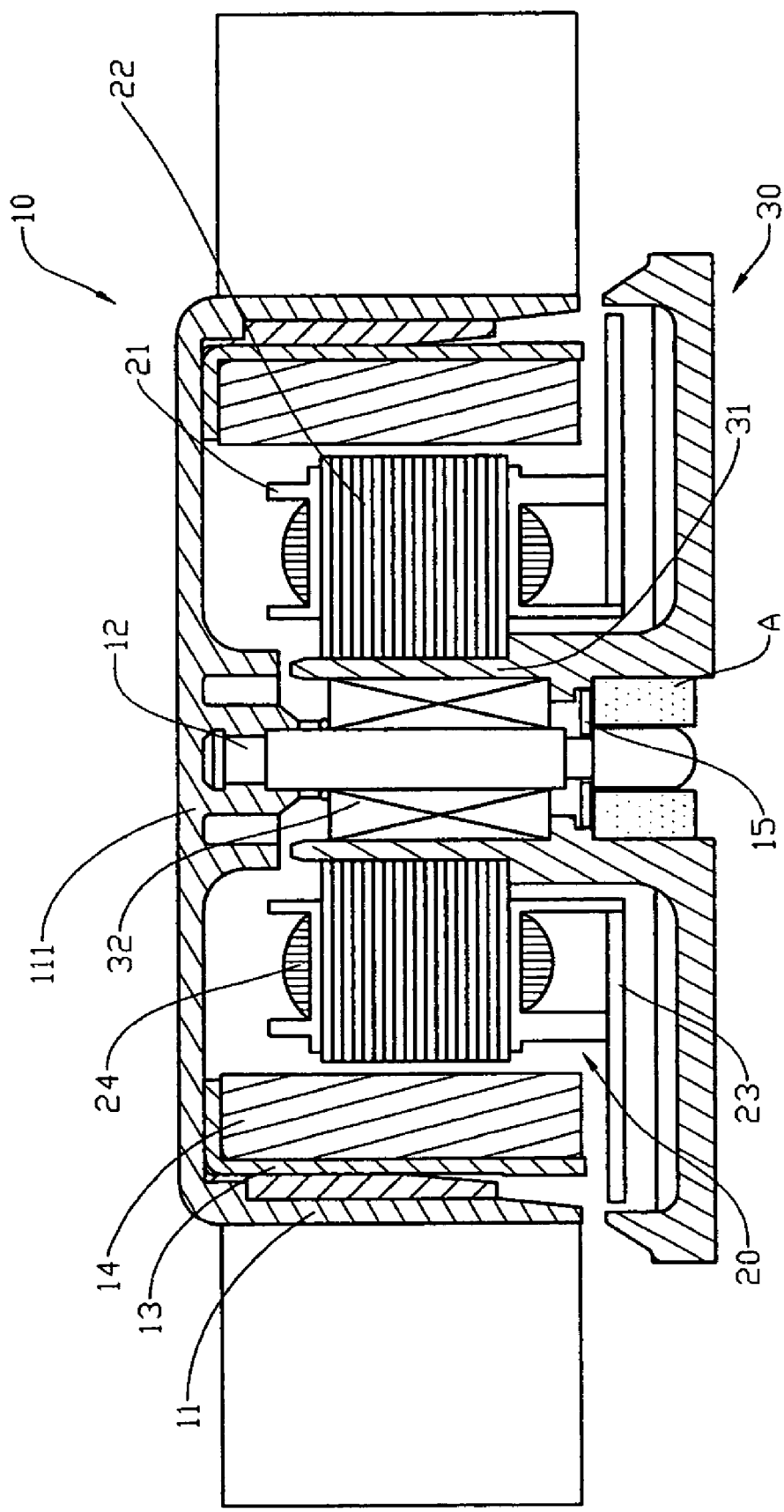
FIG. 2 is a sectional view of the second embodiment of a bearing assembly with auxiliary magnetism according to the present invention.
Figure 3:
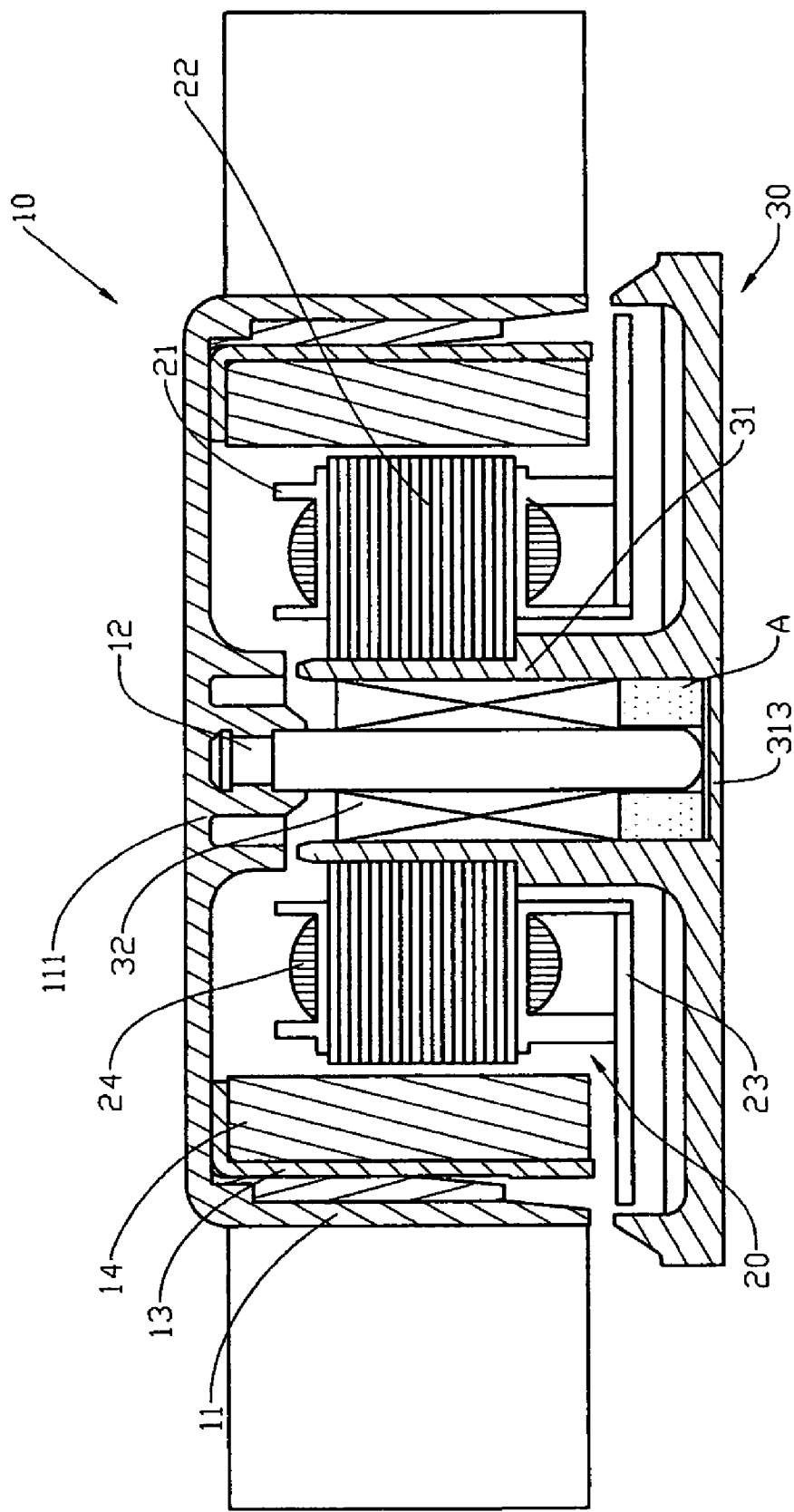
FIG. 3 is a sectional view of the third embodiment of a bearing assembly with auxiliary magnetism according to the present invention.

Referring to FIGS. 2 and 3, the second and the third embodiments of a bearing assembly with auxiliary magnetism according to the present invention are illustrated. The structures of the second and third embodiments are about the same as the first embodiment and the main difference is that the size of the magnetic part A can be arranged to comply with the configurations and sizes of the shaft 12 and the bearing 32. Further, the shaft seat 31 in the second embodiment provides an open central bottom of the hollow part thereof.

While the invention has been described with referencing to preferred embodiments thereof, it is to be understood that modifications or variations may be easily made without departing from the spirit of this invention, which is defined by the appended claims.

What is claimed is:

1. A fan motor with auxiliary magnetism, comprising:

a fan blade hub, providing a hollow hub seat;

a fan base, being disposed opposite to the fan blade hub and providing a hollow shaft seat;

a bearing, being disposed in the hollow shaft seat and fitting with the wall surface of the hollow shaft seat;

a shaft, fitting with the bearing with one end section thereof being rotationally attached to the hollow hub seat and the other one end section thereof extending to the bottom of the hollow shaft seat;

characterized in that the other end section of the shaft separates rest part of the shaft with a neck section, a cylindrical magnetic part with a height same as the length of the other end section surrounds the other end section of the shaft completely for the shaft being capable of running steadily in a specific position.

* * * * *